United States Patent
Wu (10) Patent No.: US 9,844,089 B2
(45) Date of Patent: Dec. 12, 2017

(54) METHOD OF HANDLING DATA TRANSMISSION AND RECEPTION IN DUAL CONNECTIVITY

(71) Applicant: HTC Corporation, Taoyuan County (TW)

(72) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 206 days.

(21) Appl. No.: 14/264,043

(22) Filed: Apr. 28, 2014

(65) Prior Publication Data

US 2014/0321263 A1    Oct. 30, 2014

Related U.S. Application Data

(60) Provisional application No. 61/816,814, filed on Apr. 29, 2013.

(51) Int. Cl.
*G01R 31/08* (2006.01)
*H04W 76/02* (2009.01)
*H04L 12/24* (2006.01)

(52) U.S. Cl.
CPC ........... *H04W 76/028* (2013.01); *H04L 41/22* (2013.01)

(58) Field of Classification Search
CPC ..................................................... H04L 45/28
USPC ....................................................... 370/216
See application file for complete search history.

(56) References Cited

U.S. PATENT DOCUMENTS

| | | | | |
|---|---|---|---|---|
| 9,100,883 | B2* | 8/2015 | Bontu | H04W 36/0083 |
| 2009/0275329 | A1* | 11/2009 | Sokondar | H04W 48/16 |
| | | | | 455/434 |
| 2014/0198734 | A1* | 7/2014 | Yamada | H04W 76/00 |
| | | | | 370/329 |
| 2014/0293903 | A1* | 10/2014 | Kuo | H04W 24/02 |
| | | | | 370/329 |

OTHER PUBLICATIONS

3GPP TSG-RAN WG2 Meeting #81bis, R2-131164, Study of Solutions and Radio Protocol Architecture for Dual-Connectivity, Apr. 15, 2013.

(Continued)

*Primary Examiner* — Samina Choudhry
(74) *Attorney, Agent, or Firm* — Winston Hsu (57) ABSTRACT

A method of handling data transmission and reception in dual connectivity, for a communication device in a wireless communication system is disclosed. The method comprises connecting to at least two evolved base station (eNBs) including a first eNB and a second eNB in the wireless communication system, being configured a packet data convergence protocol (PDCP) entity corresponding to at least two radio link control (RLC) entities including a first RLC entity for receiving/transmitting data from/to the first eNB and a second RLC entity for receiving/transmitting data from/to the second eNB, and when detecting a radio link failure a connection to the second eNB, not initiating a radio resource control (RRC) connection re-establishment procedure for connection recovery.

14 Claims, 5 Drawing Sheets

(56) References Cited

OTHER PUBLICATIONS

3GPP TS 36.331 V11.3.0, 3rd Generation Partnership Project; Technical Specification Group Radio Access Network; Evolved Universal Terrestrial Radio Access (E-UTRA); Radio Resource Control (RRC); Protocol specification (Release 11), Mar. 2013.

3GPP TR 36.932 V12.0.0, 3rd Generation Partnership Project; Technical Specification Group Radio Access Network; Scenarios and Requirements for Small Cell Enhancements for E-UTRA and E-UTRAN (Release 12), Dec. 2012.

3GPP TS 36.323 V11.2.0, 3rd Generation Partnership Project; Technical Specification Group Radio Access Network; Evolved Universal Terrestrial Radio Access (E-UTRA); Packet Data Convergence Protocol (PDCP) specification (Release 11), Mar. 2013.

\* cited by examiner

METHOD OF HANDLING DATA TRANSMISSION AND RECEPTION IN DUAL CONNECTIVITY

CROSS REFERENCE TO RELATED APPLICATIONS

This application claims the benefit of U.S. Provisional Application No. 61/816,814, filed on Apr. 29, 2013 and entitled "Method and Apparatus for handling PDCP transmission and reception in a wireless communication system", the contents of which are incorporated herein in their entirety.

BACKGROUND OF THE INVENTION

1. Field of the Invention

The present invention relates to a method used in a communication device in a wireless communication system, and more particularly, to a method of handling data transmission and reception in dual connectivity.

2. Description of the Prior Art

The 3rd Generation Partnership Project (3GPP) in Release 12 studies small cell enhancement. Small cells using low power nodes are considered promising to cope with mobile traffic explosion, especially for hotspot deployments in indoor and outdoor scenarios. A low-power node generally means a node whose Tx power is lower than macro node and BS classes, for example Pico and Femto eNB are both applicable. Small cell enhancements for E-UTRA and E-UTRAN will focus on additional functionalities for enhanced performance in hotspot areas for indoor and outdoor using low power nodes.

In addition, 3GPP in Release 12 proposes dual connectivity for increasing user's throughput. Dual connectivity to macro and small cells may be served by different eNBs, linked with non-ideal backhaul, e.g., there may be an eNB in charge of a cluster of small cells in a hotspot area. Therefore, UE may be served by multiple eNBs when it is in dual connectivity mode.

Figure 1:
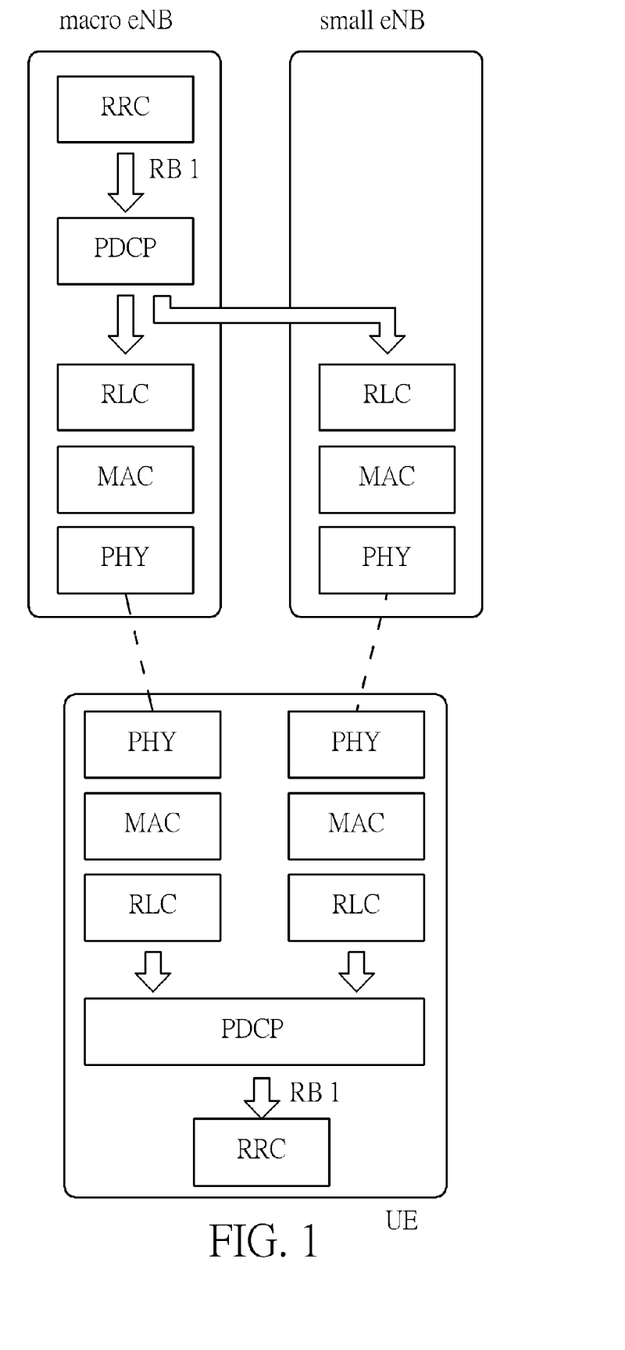
FIG. 1 illustrates a schematic diagram of protocol structure of a macro eNB, small eNB, and a UE in dual connectivity.

Please refer to FIG. 1, which illustrates protocol structure of a macro eNB, small eNB, and a UE in dual connectivity. In dual connectivity, the UE connects to the macro eNB and small eNB. The downlink data of the radio bear RB1 starts to be distributed by the macro eNB, and is transmitted to the UE by the macro eNB and small eNB. In detail, there is a centralized packet data convergence protocol (PDCP) entity at the macro eNB for both macro and small eNB, and thus security and header compression is controlled by the macro eNB. The PDCP entity of the macro eNB receives downlink data from the radio bear RB1 established by the radio resource control (RRC) entity, and transmits the downlink data to the radio link control (RLC) entity of the macro eNB toward the UE via a component carrier. Meanwhile, the PDCP entity of the macro eNB distributes the downlink data to the RLC entity of the small eNB toward the UE via another component carrier. The component carrier and the other component carrier may belong to different frequency bands. In other words, downlink data carried by the radio bear RB1 is distributed between PDCP and RLC entities, so that traffic QoS is balanced between macro eNB and small eNB as well. On the other hand, the UE includes one PDCP entity corresponding to two RLC entities, wherein a first RLC entity receives the downlink data from the macro eNB and a second RLC entity receives the downlink data from small eNB. Then, the two RLC entities deliver the downlink data to the one PDCP entity corresponding to the radio bear RB1. In reverse, the UE may perform uplink data transmission to the macro eNB via a component carrier and small eNB via another component carrier with the abovementioned protocol structure. Note that, according to the characteristic of a radio bear mapping to the RLC entities, the RLC entities may be in an acknowledged (AM) mode or Unacknowledged (UM) mode for data transmission. The functionality of PDCP/RLC/MAC/PHY entities should be well-known in the art, so it is omitted herein.

In addition, based on 3GPP TS 36.331 V 11.3.0 specification, the UE shall initiate a RRC connection re-establishment procedure when one of the following conditions is met: upon detecting radio link failure, handover failure, mobility from E-UTRA failure, integrity check failure indication from lower layers or an RRC connection reconfiguration failure. Upon initiation of the RRC connection re-establishment procedure, the UE shall stop timer T310 if running, suspend all RBs except SRB0, or reset MAC. Moreover, the UE shall re-establish PDCP for SRB1, or re-establish RLC for SRB1 when the UE receives an RRCConnectionReestablishment message. On the other hand, the UE considers radio link failure upon T310 expiry, upon random access problem indication from MAC while neither T300, T301, T304 nor T311 is running or upon indication from RLC that the maximum number of transmissions has been reached.

Furthermore, based on 3GPP TS 36.323 V11.2.0 specification, when upper layers request a PDCP re-establishment, for radio bearers that are mapped on RLC AM, the UE shall compile the PDCP status report as indicated below after processing the PDCP Data PDUs that are received from lower layers due to the re-establishment of the lower layers, and submit it to lower layers as the first PDCP PDU for the transmission if the radio bearer is configured by upper layers to send a PDCP status report in the uplink, by setting the FMS field to the PDCP SN of the first missing PDCP SDU, if there is at least one out-of-sequence PDCP SDU stored, allocating a Bitmap field of length in bits equal to the number of PDCP SNs from and not including the first missing PDCP SDU up to and including the last out-of-sequence PDCP SDUs, setting as '0' in the corresponding position in the bitmap field for all PDCP SDUs that have not been received as indicated by lower layers, and optionally PDCP SDUs for which decompression have failed, indicating in the bitmap field as '1' for all other PDCP SDUs. In a word, the PDCP Status Report is used for requesting retransmission of PDCP SDUs, and is transmitted from the receiver to the transmitter in order to inform the transmitter about the PDCP PDUs that were received or not received by the receiver PDCP entity, such that non-received PDCP SDUs can be retransmitted and received PDCP SDUs need not be retransmitted.

However, the applicant notices a problem associated to RRC connection re-establishment procedure in dual connectivity. As abovementioned, in dual connectivity, a PDCP entity of the UE corresponds to a first RLC entity for data reception/transmission from/to the small eNB and a second RLC entity for data reception/transmission from/to the macro eNB. When the first RLC entity reaches RLC maximum number of transmissions or a radio link failure occurs on a first connection to the small eNB, the UE performs a RRC connection re-establishment procedure even when a second connection to the macro eNB, where a plurality of RLC PDUs of the second RLC entity are transmitted or received, does not have radio link failure. In this situation, the RLC PDUs transmission of the second RLC entity to the macro eNB is stopped due to the RRC connection re-establishment procedure for connection recovery. Similarly, the RLC PDUs reception of the second RLC entity from the macro eNB is also stopped due to the RRC connection re-establishment procedure for connection recovery.

SUMMARY OF THE INVENTION

It is there for an objective to provide a method of handling PDCP transmission and reception in dual connectivity to solve the above problem.

The present invention discloses a method of handling data transmission and reception in dual connectivity, for a communication device in a wireless communication system. The method comprises connecting to at least two evolved base station (eNBs) including a first eNB and a second eNB in the wireless communication system, being configured a packet data convergence protocol (PDCP) entity corresponding to at least two radio link control (RLC) entities including a first RLC entity for receiving/transmitting data from/to the first eNB and a second RLC entity for receiving/transmitting data from/to the second eNB, and when detecting a radio link failure on a connection to the second eNB, not initiating a radio resource control (RRC) connection re-establishment procedure for connection recovery.

The present invention discloses a method of handling data transmission and reception in dual connectivity, for a first evolved base station (eNB) in a wireless communication system. The method comprises connecting to a communication device in the wireless communication system, being configured a packet data convergence protocol (PDCP) entity corresponding to at least two radio link control (RLC) entities including a first RLC entity of the first eNB and a second RLC entity of a second eNB in the wireless communication system for receiving/transmitting data from/to the communication device, and when detecting a radio link failure on a connection to the communication device, continuing data reception/transmission from/to the communication device via the second eNB.

The present invention discloses a method of handling data transmission and reception in dual connectivity, for a first eNB in a wireless communication system. The method comprises connecting to a communication device in the wireless communication system, being configured a radio link control (RLC) entity which is configured for receiving/transmitting data from/to the communication device by a packet data convergence protocol (PDCP) entity of a second eNB connecting to the communication device in the wireless communication system, and when detecting a radio link failure on a connection to the communication device, notifying the second eNB of the radio link failure, whereby the second eNB continuing data reception/transmission from/to the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
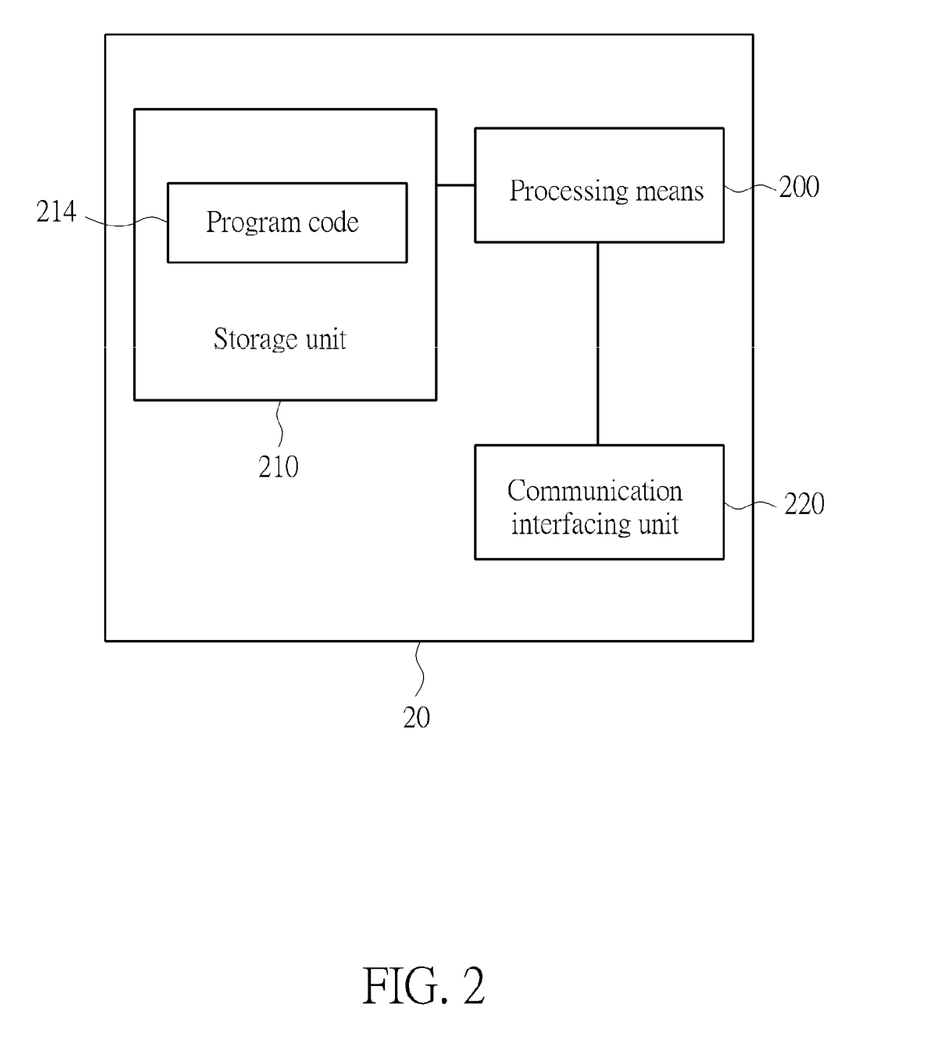
FIG. 2 illustrates a schematic diagram of an exemplary communication device.

FIG. 2 illustrates a schematic diagram of an exemplary communication device 20. The communication device 20 can be the UE, macro eNB, or small eNB shown in FIG. 1. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with a network (i.e. E-UTRAN) according to processing results of the processing means 200.

Figure 3:
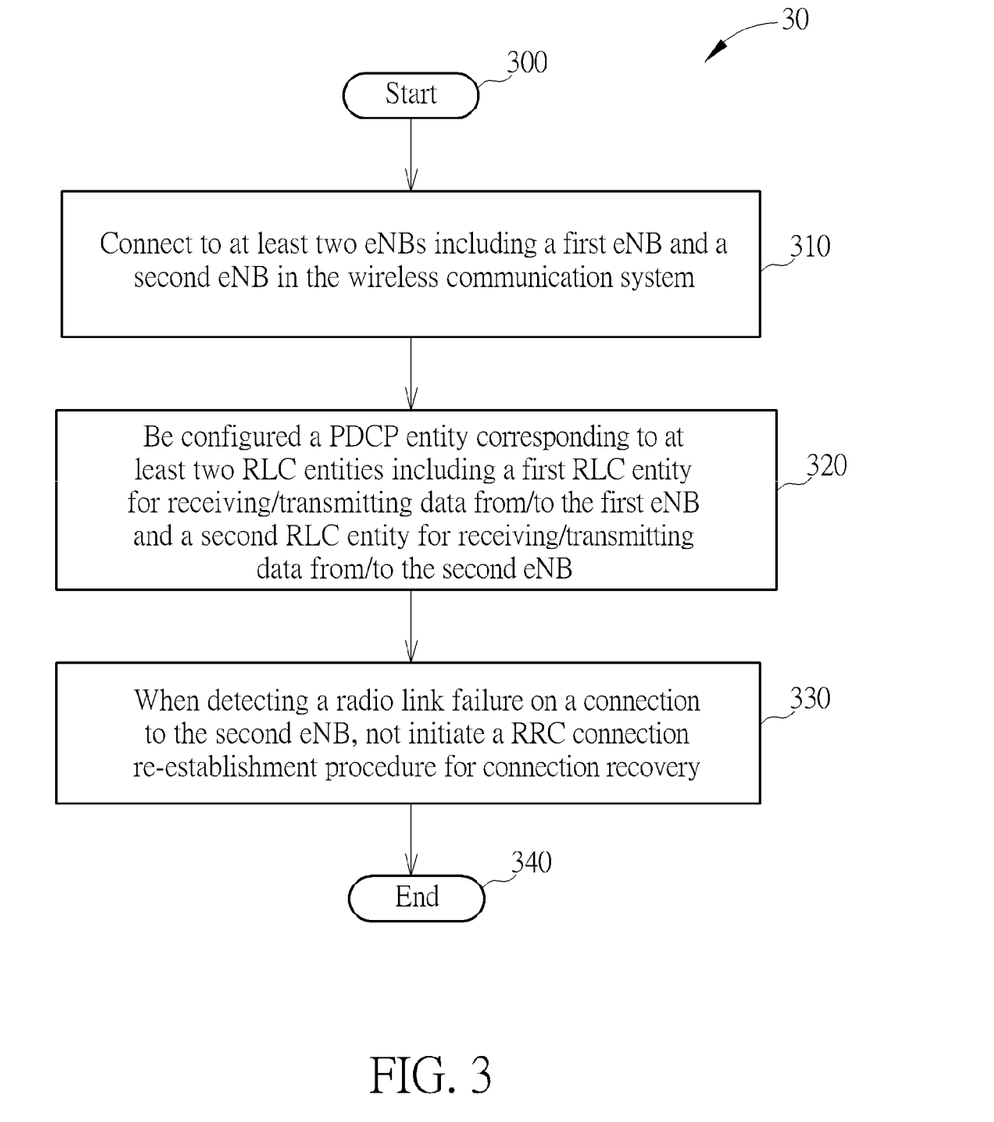
FIGS. 3-5 are flowcharts of an exemplary process according to the present disclosure.

Please refer to FIG. 3, which is a flowchart of a process 30 according to an example of the present disclosure. The process 30 is utilized in the communication device 20 (i.e. a UE) for data transmission and reception in dual connectivity. The process 30 may be compiled into a program code 214 to be stored in the storage unit 210, and may include the following steps:

Step 300: Start.

Step 310: Connect to at least two eNBs including a first eNB and a second eNB in the wireless communication system.

Step 320: Be configured a PDCP entity corresponding to at least two RLC entities including a first RLC entity for receiving/transmitting data from/to the first eNB and a second RLC entity for receiving/transmitting data from/to the second eNB.

Step 330: When detecting a radio link failure on a connection to the second eNB, not initiate a RRC connection re-establishment procedure for connection recovery.

Step 340: End.

According to the process 30, the UE is configured connections to a first eNB and a second eNB to receive data from the first eNB and second eNB, wherein the first eNB may be a macro eNB and the second eNB may be a small eNB. When the UE detects a radio link failure on one of the connections to the two eNBs, the UE does not initiate a RRC connection re-establishment procedure for recovering the connections to the first eNB and the second eNB. Thus, the UE can continue receiving data from the eNB which no radio link failure is detected on the other connection to. On the other hand, the UE may transmit data to the first eNB and the second eNB. If the UE detects a radio link failure on one of the two connections to the two eNBs, the UE does not initiate the RRC connection re-establishment procedure, but continues transmitting data to the eNB which no radio link failure is detected on the other connection to. With such manner, the UE can perform data reception/transmission without suspension since there is only one connection has the radio link failure, so as to avoid resource wasting.

Moreover, the UE may send a first PDCP status report indicating at least one missing PDCP SDU to the eNB which no radio link failure is detected on the connection to. When the eNB receives the PDCP status report, the eNB transmits the at least one missing PDCP SDU to the UE.

Note that, the UE may detect the radio link failure on a connection to an eNB due to expiry of a timer T310 for the eNB, random access problem in a MAC entity for the eNB, or maximum number of transmissions has been reached in a RLC entity for data transmission to the eNB. Moreover, when the UE detects the radio link failure on a connection to the first eNB, the UE sends a RRC message to indicate the radio link failure on the connection to the first eNB, to the second eNB. When the second eNB receives the RRC message, the second eNB transmits a PDCP status report indicating at least one missing PDCP SDU to the UE. In addition, when the UE receives the PDCP status report, the UE transmits the at least one missing PDCDP SDU to the second eNB.

In an embodiment, the UE may send a first PDCP status report for indicating the radio link failure on the connection to the first eNB, to the second eNB. When the second eNB receives the first PDCP status report, the second eNB transmits a second PDCP status report indicating at least one missing PDCP SDU to the UE. When the UE receives the second PDCP status report, the UE transmits the at least one missing PDCDP SDU to the second eNB.

Note that, the PDCP entity of the UE is used to transmit/receive either RRC message or internet protocol (IP) packets. In addition, the first and second RLC entities of the UE for transmitting/receiving data to the first eNB and second eNB are both in the same mode (i.e. an acknowledged mode (AM) or unacknowledged mode (UM)).

Figure 4:
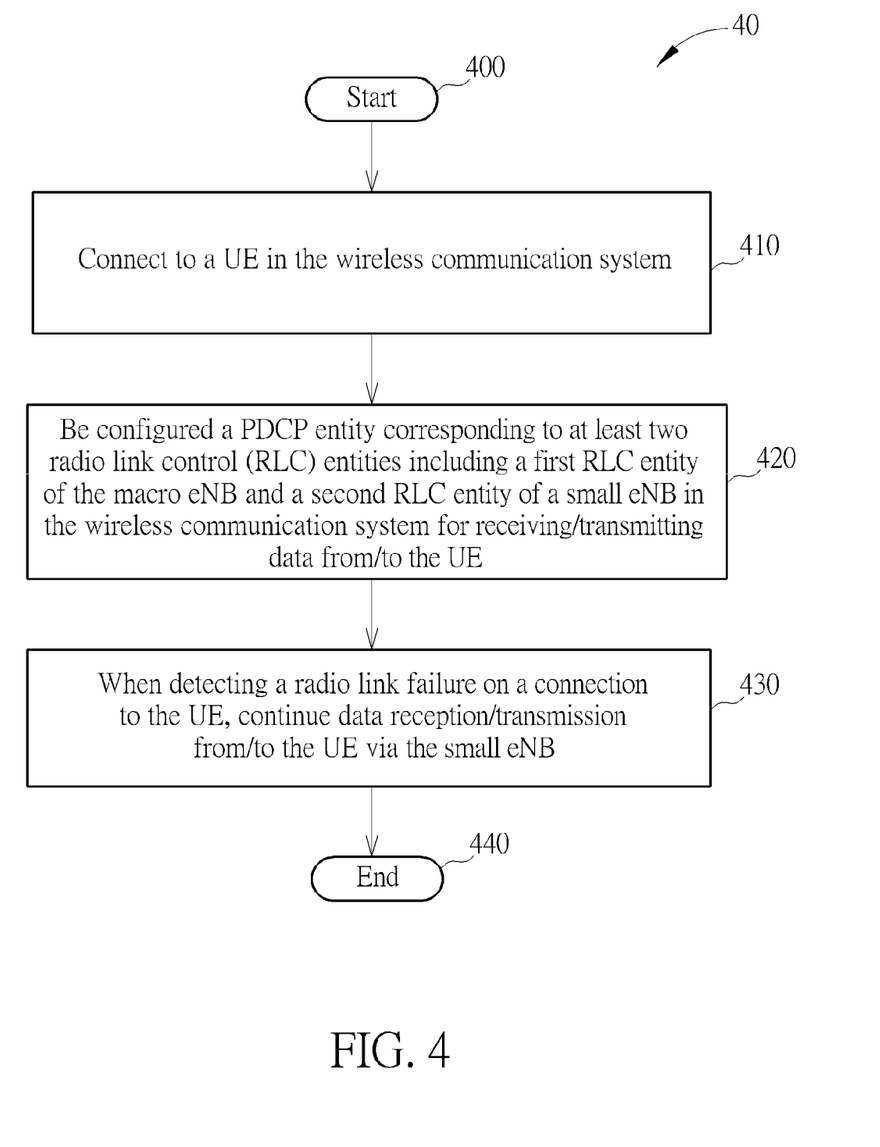

Please refer to FIG. 4, which is a flowchart of a process 40 according to an example of the present disclosure. The process 40 is utilized in the communication device 20 (i.e. a macro eNB) for data transmission and reception in dual connectivity. The process 40 may be compiled into a program code 214 to be stored in the storage unit 210, and may include the following steps:

Step 400: Start.

Step 410: Connect to a UE in the wireless communication system.

Step 420: Be configured a PDCP entity corresponding to at least two radio link control (RLC) entities including a first RLC entity of the macro eNB and a second RLC entity of a small eNB in the wireless communication system for receiving/transmitting data from/to the UE.

Step 430: When detecting a radio link failure on a connection to the UE, continue data reception/transmission from/to the UE via the small eNB.

Step 440: End.

According to the process 40, when the macro eNB detects a radio link failure on the connection to the UE, the macro eNB keeps receiving data from the UE with the small eNB. And/Or, the macro eNB may keep transmitting data to the UE with the small eNB when the macro eNB detects the radio link failure on the connection to the UE. With such manner, data reception/transmission is not suspended since the macro eNB can receive or transmit data from or to the UE through the small eNB.

In addition, the macro eNB sends a PDCP status report indicating at least one missing PDCP SDU to the UE. When the UE receives the PDCP status report, the UE transmits the at least one missing PDCP SDU to the macro eNB via the small eNB.

Note that, the macro eNB may detect the radio link failure on the connection to the UE due to expiry of a timer for the UE, where the timer expires because the macro eNB cannot receives physical layer signal (e.g. channel state information (e.g. channel quality indicator)) from the UE in a time period, or maximum number of transmissions has been reached in the RLC entity of the macro eNB. Moreover, when the macro eNB detects the radio link failure on the connection to the UE, the macro eNB may send a first PDCP status report for indicating the radio link failure, to the UE via the small eNB. When the UE receives the first PDCP status report, the UE transmits a second PDCP status report indicating at least one missing PDCP SDU to the macro eNB via the small eNB. When the macro eNB receives the second PDCP status report, the macro eNB transmits the at least one missing PDCDP SDU to the UE via the small eNB.

Note that, a first RLC entity of a macro eNB and a second RLC entity of a small eNB for transmitting/receiving data to the UE are both in the same mode (i.e. an acknowledged mode (AM) or unacknowledged mode (UM)).

Figure 5:
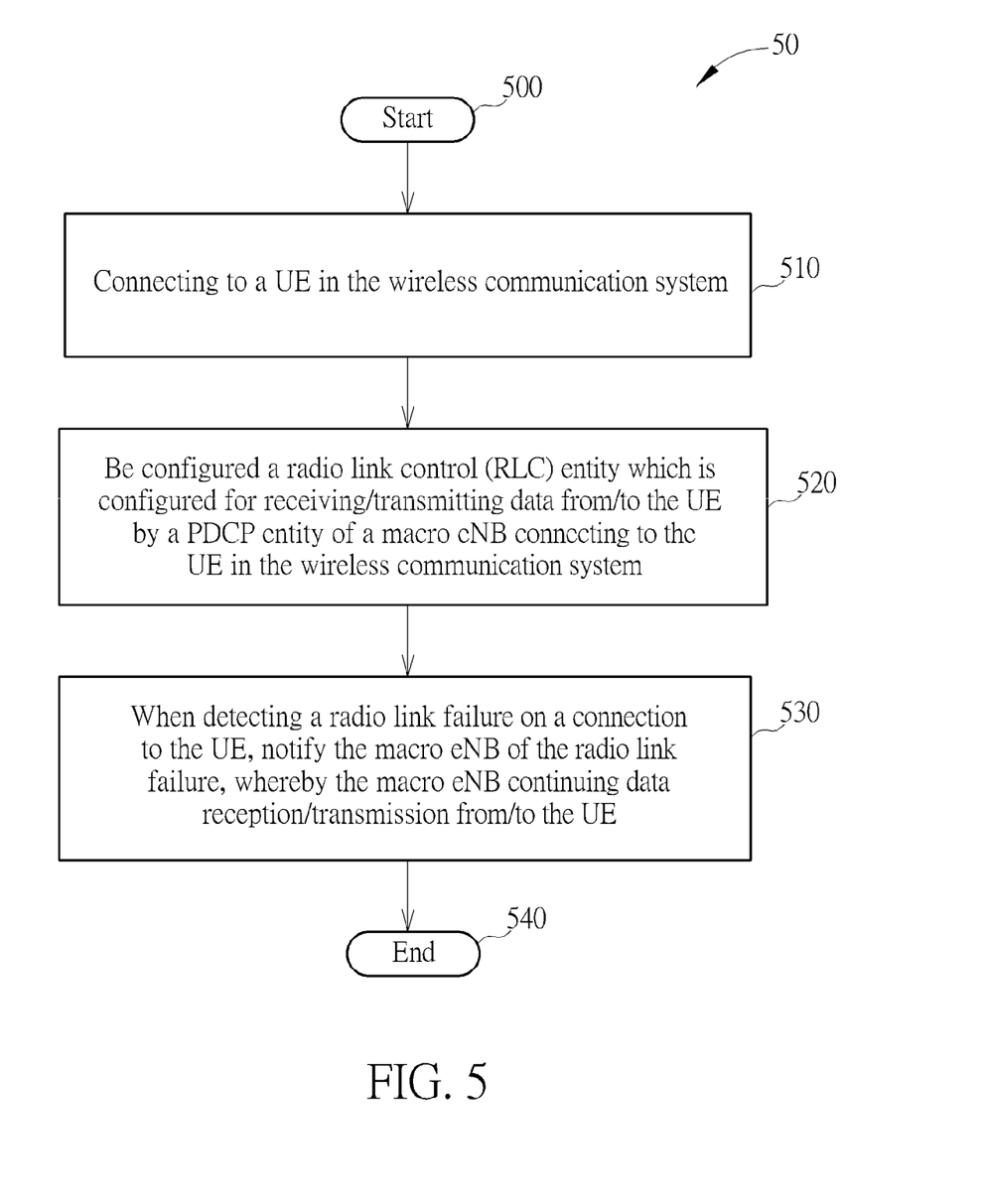

Please refer to FIG. 5, which is a flowchart of a process 50 according to an example of the present disclosure. The process 50 is utilized in the communication device 20 (i.e. a small eNB) for data transmission and reception in dual connectivity. The process 50 may be compiled into a program code 214 to be stored in the storage unit 210, and may include the following steps:

Step 500: Start.

Step 510: Connect to a UE in the wireless communication system.

Step 520: Be configured a radio link control (RLC) entity which is configured for receiving/transmitting data from/to the UE by a PDCP entity of a macro eNB connecting to the UE in the wireless communication system.

Step 530: When detecting a radio link failure on a connection to the UE, notify the macro eNB of the radio link failure, whereby the macro eNB continuing data reception/transmission from/to the UE.

Step 540: End.

According to the process 50, when the small eNB detects a radio link failure on the connection to the UE, the small eNB notifies the macro eNB the radio link failure and the macro eNB continues receiving/transmitting data from/to the UE. With such manner, data reception/transmission is not suspended since only connection to the small eNB has radio link failure. In other words, the UE can continuously receive/transmit data from/to the macro eNB.

In addition, the macro eNB may send a PDCP status report indicating at least one missing PDCP SDU to the UE. When the UE receives the PDCP status report, the UE transmits the at least one missing PDCP SDU to the macro eNB. Similarly, the UE can send a PDCP status report indicating at least one missing PDCP SDU to the macro eNB. When the macro eNB receives the PDCP status report, the macro eNB transmits the at least one missing PDCP SDU to the UE.

Note that, the small eNB may detect the radio link failure on the connection to the UE due to expiry of a timer for the UE, where the timer expires because the small eNB cannot receives physical layer signal (e.g. channel state information (e.g. channel quality indicator)) from the UE in a time period, or maximum number of transmissions toward to a RLC entity of the UE has been reached in the RLC entity of the small eNB.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, the present invention provides a data transmission and reception in dual connectivity, so as to avoid resource wasting.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling data transmission and reception in dual connectivity, for a first base station in a wireless communication system, comprising:
   the first base station connecting to a communication device in the wireless communication system;
   the first base station being configured a packet data convergence protocol (PDCP) entity corresponding to at least two radio link control (RLC) entities including a first RLC entity of the first base station and a second RLC entity of a second base station in the wireless communication system for receiving/transmitting data from/to the communication device; and
   when the first base station detects a radio link failure on a connection from the first base station to the communication device, the first base station continuing data reception/transmission from/to the communication device via the second base station.

2. The method of claim 1, further comprising:
   the first base station transmitting a first PDCP status report indicating at least one missing PDCP SDU, to the communication device via the second base station, whereby the communication device transmits the at least one missing PDCP SDU to the first base station with the second base station when receiving the first PDCP status report.

3. The method of claim 1, further comprising:
   the first base station transmitting a first PDCP status report for indicating the radio link failure on the communication device to the communication device via the second base station, whereby the communication device transmits a second PDCP status report indicating at least one missing PDCP SDU to the first base station via the second base station.

4. The method of claim 3, further comprising:
   the first base station transmitting the at least one missing PDCP SDU to the communication device when receiving the second PDCP status report from the communication device.

5. The method of claim 1, wherein the first base station detects the radio link failure due to a timer expiry, wherein the timer expires because the first base station cannot receives a physical layer signal from the communication device in a time period or maximum number of transmissions has been reached in the RLC entity of the first base station.

6. A method of handling data transmission and reception in dual connectivity, for a first base station in a wireless communication system, comprising:
   the first base station connecting to a communication device in the wireless communication system;
   the first base station being configured a radio link control (RLC) entity which is configured for receiving/transmitting data from/to the communication device by a second base station connecting to the communication device in the wireless communication system; and
   when the first base station detects a radio link failure on a connection from the first base station to the communication device, the first base station notifying the second base station of the radio link failure, whereby the second base station continuing data reception/transmission from/to the communication device.

7. The method of claim 6, wherein the first base station detects the radio link failure due to a timer expiry, wherein the timer expires because the first base station cannot receives a physical layer signal from the communication device in a time period or maximum number of transmissions has been reached in the RLC entity of the first base station.

8. A first base station of a wireless communication system for handling data transmission and reception in dual connectivity, comprising:
   a memory for storing program code corresponding to a process; and
   a processor coupled to the memory, for processing the program code to execute the process;
   wherein the process comprises:
   connecting to a communication device in the wireless communication system;
   being configured a packet data convergence protocol (PDCP) entity corresponding to at least two radio link control (RLC) entities including a first RLC entity of the first base station and a second RLC entity of a second base station in the wireless communication system for receiving/transmitting data from/to the communication device; and
   when the first base station detects a radio link failure on a connection from the first base station to the communication device, continuing data reception/transmission from/to the communication device via the second base station.

9. The first base station of claim 8, wherein the process further comprises:
   transmitting a first PDCP status report indicating at least one missing PDCP SDU, to the communication device via the second base station, whereby the communication device transmits the at least one missing PDCP SDU to the first with the second base station when receiving the first PDCP status report.

10. The first base station of claim 8, wherein the process further comprises:
    transmitting a first PDCP status report for indicating the radio link failure on the communication device to the communication device via the second base station, whereby the communication device transmits a second PDCP status report indicating at least one missing PDCP SDU to the first base station via the second base station.

11. The first base station of claim 10, wherein the process further comprises:
    transmitting the at least one missing PDCP SDU to the communication device when receiving the second PDCP status report from the communication device.

12. The first base station of claim 8, wherein the first base station detects the radio link failure due to a timer expiry, wherein the timer expires because the first base station cannot receives a physical layer signal from the communication device in a time period or maximum number of transmissions has been reached in the RLC entity of the first base station.

13. A first base station of a wireless communication system for handling data transmission and reception in dual connectivity, comprising:
    a memory for storing program code corresponding to a process; and
    a processor coupled to the memory, for processing the program code to execute the process;

wherein the process comprises:

connecting to a communication device in the wireless communication system;

being configured a radio link control (RLC) entity which is configured for receiving/transmitting data from/to the communication device by a second base station connecting to the communication device in the wireless communication system; and when the first base station detects a radio link failure on a connection from the first base station to the communication device, notifying the second base station of the radio link failure, whereby the second base station continuing data reception/transmission from/to the communication device.

14. The first base station of claim 13, wherein the first base station detects the radio link failure due to a timer expiry, wherein the timer expires because the first base station cannot receives a physical layer signal from the communication device in a time period or maximum number of transmissions has been reached in the RLC entity of the first base station.

* * * * *